(12) United States Patent
Horvitz et al.

(10) Patent No.: US 10,504,362 B2
(45) Date of Patent: Dec. 10, 2019

(54) SELECTIVE EXCHANGE OF VEHICLE OPERATIONAL DATA

(71) Applicant: Microsoft Technology Licensing, LLC, Redmond, WA (US)

(72) Inventors: Eric J. Horvitz, Kirkland, WA (US); Jonathan David Canan, Bellevue, WA (US); Gur Kimchi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 398 days.

(21) Appl. No.: 14/269,586

(22) Filed: May 5, 2014

(65) Prior Publication Data
US 2014/0244148 A1    Aug. 28, 2014

Related U.S. Application Data

(60) Division of application No. 13/666,543, filed on Nov. 1, 2012, now Pat. No. 8,793,063, which is a
(Continued)

(51) Int. Cl.
*G08G 1/00* (2006.01)
*G08G 1/0968* (2006.01)
(Continued)

(52) U.S. Cl.
CPC ........... *G08G 1/00* (2013.01); *G01C 21/3438* (2013.01); *G01C 21/3461* (2013.01);
(Continued)

(58) Field of Classification Search
CPC ........ G08G 1/00; G08G 1/0104; G08G 1/052; G08G 1/0965; G08G 1/0112;
(Continued)

(56) References Cited

U.S. PATENT DOCUMENTS 6,374,177 B1   4/2002 Lee et al.
6,539,302 B1   3/2003 Bender et al.
(Continued)

FOREIGN PATENT DOCUMENTS

EP   0860954   8/1998
EP   1876796   1/2008
(Continued)

OTHER PUBLICATIONS

The Chinese Office Action dated Sep. 24, 2013 for Chinese patent application No. 200980134152.8, a counterpart foreign application of U.S. Pat. No. 8,315,786, 6 pages.
(Continued)

*Primary Examiner* — Jeffrey A Shapiro
(74) *Attorney, Agent, or Firm* — Newport IP, LLC; Jacob P. Rohwer

(57) ABSTRACT

Velocity information can be beneficial to various entities including other vehicles and a central traffic monitoring and routing system. Vehicles with sensors can serve as velocity probes to update speeds that are shared via a more global service. However, individuals may be reluctant to provide location and velocity information given privacy preferences. Local policies about sharing personal data are described that can be harnessed to enhance privacy while minimizing communication costs. The local data-sharing policies allow devices to monitor their own speeds and locations and to employ models and analyses that determine the value of sharing flow information with a larger service in accordance with privacy preferences, and to make local decisions as to when to respond to broadcasted queries for specific information, while minimizing the redundancy of signals from multiple vehicles.

20 Claims, 13 Drawing Sheets

Related U.S. Application Data continuation of application No. 12/163,631, filed on Jun. 27, 2008, now Pat. No. 8,315,786.

(51) Int. Cl.
- *G01C 21/34* (2006.01)
- *G08G 1/01* (2006.01)
- *G08G 1/052* (2006.01)
- *G08G 1/0965* (2006.01)

(52) U.S. Cl.
CPC ....... *G01C 21/3492* (2013.01); *G08G 1/0104* (2013.01); *G08G 1/0112* (2013.01); *G08G 1/0141* (2013.01); *G08G 1/052* (2013.01); *G08G 1/0965* (2013.01); *G08G 1/0968* (2013.01); *G08G 1/20* (2013.01); *G08G 1/22* (2013.01)

(58) Field of Classification Search
CPC .... G08G 1/0141; G08G 1/0968; G08G 1/133; G08G 1/20; G08G 1/205; G08G 1/207; G08G 1/22; G08G 7/00; G01C 21/3438; G01C 21/3461; G01C 21/3492; B60L 2240/68; B60W 2550/20; B60W 2550/22; B60W 2550/30; B60W 40/40
USPC ................ 701/117–120, 423, 430, 461, 462, 701/482–484, 516, 522, 537, 540, 515; 340/466, 991, 901–903, 933–936, 905
See application file for complete search history.

(56) References Cited

U.S. PATENT DOCUMENTS

| | | | |
|---|---|---|---|
| 6,564,047 | B1 | 5/2003 | Steele et al. |
| 6,606,033 | B1 | 8/2003 | Crocker et al. |
| 6,922,629 | B2 | 7/2005 | Yoshikawa et al. |
| 7,065,447 | B2 | 6/2006 | Shimizu et al. |
| 7,782,181 | B2 | 8/2010 | Hines |
| 8,170,911 | B1* | 5/2012 | Pender et al. ............. 705/14.27 |
| 8,386,145 | B2 | 2/2013 | Rothschild |
| 2001/0001848 | A1 | 5/2001 | Oshizawa et al. |
| 2001/0029425 | A1 | 10/2001 | Myr |
| 2002/0198653 | A1 | 12/2002 | Lutter |
| 2003/0058216 | A1* | 3/2003 | Lacroix et al. ............... 345/156 |
| 2003/0060973 | A1 | 3/2003 | Mathews et al. |
| 2003/0216859 | A1 | 11/2003 | Martell et al. |
| 2004/0246147 | A1 | 12/2004 | von Grabe |
| 2005/0027444 | A1 | 2/2005 | Kim |
| 2005/0099321 | A1* | 5/2005 | Pearce .................... 340/995.13 |
| 2006/0106530 | A1 | 5/2006 | Horvitz |
| 2006/0229778 | A1 | 10/2006 | Obradovich et al. |
| 2008/0002583 | A1* | 1/2008 | Liu et al. ...................... 370/235 |
| 2008/0002587 | A1* | 1/2008 | Liu et al. ...................... 370/238 |
| 2008/0186206 | A1* | 8/2008 | Reumerman ................. 340/902 |
| 2008/0228712 | A1* | 9/2008 | Nomura ............................ 707/3 |
| 2008/0275628 | A1* | 11/2008 | Xu .................. G08G 1/096716 701/117 |
| 2009/0005987 | A1 | 1/2009 | Vengroff et al. |
| 2009/0224941 | A1* | 9/2009 | Kansal .................... H04Q 9/00 340/870.06 |
| 2009/0287401 | A1* | 11/2009 | Levine et al. ................ 701/117 |
| 2009/0326791 | A1 | 12/2009 | Horvitz |
| 2011/0173015 | A1 | 7/2011 | Chapman et al. |

FOREIGN PATENT DOCUMENTS

| | | |
|---|---|---|
| JP | 8292248 A | 11/1996 |
| KR | 20030039578 A | 5/2003 |
| KR | 10-0677328 B1 | 2/2007 |
| KR | 10-0834939 B1 | 5/2008 |

OTHER PUBLICATIONS

Pang, et al., "Adaptive route selection for dynamic route guidance system based on fuzzy-neural approaches", Nov. 1999, p. 76-82, Hitachi Research Laboratory Hitachi, Ltd. Japan.

"Car 2 Car Communication Consortium: Overview of the C2C-CC System", Aug. 28, 2007, retrieved from the internet at http://www.car-to-car.org/index.php?eID=tx_nawsecuredl&u=0&file=fileadmin/downloads/C2C-CC_manifesto_v1.1.pdf&t=1332491768?hash=833deb584ba358b5c6eb9c520c805fc1b4090e2, retrieved on Mar. 22, 2012, 94 pgs.

The Chinese Office Action dated Jan. 4, 2013 for Chinese patent application No. 200980134152.8, a counterpart foreign application of U.S. Pat. No. 8,315,786, 9 pages.

The Chinese Office Action dated Mar. 5, 2014 for Chinese patent application No. 200980134152.8, a counterpart foreign application of U.S. Pat. No. 8,315,786, 6 pages.

The Chinese Office Action dated Apr. 24, 2013 for Chinese patent application No. 200980134152.8, a counterpart foreign application of U.S. Pat. No. 8,315,786, 6 pages.

The European Office Action dated Apr. 2, 2013 for European Patent Application No. 09770745.9, a counterpart foreign application of U.S. Pat. No. 8,315,786, 7 pages.

The Extended European Search Report dated Apr. 5, 2012 for European patent application No. 09770745.9, 13 pages.

Shekhar, et al., "Genesis: An Approach to Data Dissemination in Advanced Traveler Information Systems", Nov. 1994, 7 pages.

Moukas, et al., "Trafficopter: A Distributed Collection System for Traffic Information", Proc 2nd Intl Workshop on Cooperative Information Agents II, Learning, Mobility and Electronic Commerce for Information Discovery on the Internet, Lecture Notes in Computer Science, vol. 1435, Jul. 1998, 11 pages.

Office Action for U.S. Appl. No. 12/163,631, dated Apr. 4, 2011, Eric J. Horvitz, "Local Decision Policies About the Sharing of Sensed Data that Enhance Privacy and Lower Communication Costs for Services that Aggregate Data from Personal Devices".

Office Action for U.S. Appl. No. 12/163,631, dated Sep. 7, 2011, Eric J. Horvitz, "Local Decision Policies About the Sharing of Sensed Data that Enhance Privacy and Lower Communication Costs for Services that Aggregate Data from Personal Devices", 6 pgs.

Office action for U.S. Appl. No. 13/666,543, dated Oct. 9, 2013, Horvitz, et al., "Selective Exchange of Vehicle Operational Data", 7 pages.

Office Action for U.S. Appl. No. 12/163,631, dated Feb. 3, 2012, Eric J. Horvitz, "Local Decision Policies About the Sharing of Sensed Data that Enhance Privacy and Lower Communication Costs for Services that Aggregate Data from Personal Devices", 7 pgs.

Sweeney, Jr., "An Overview of Intelligent Vehicle Highway Systems (IVHS)", WESCON 93 Conf, Sep. 1993, 5 pages.

* cited by examiner

SELECTIVE EXCHANGE OF VEHICLE OPERATIONAL DATA

RELATED APPLICATIONS

This application is a divisional of, and claims priority to, co-pending, commonly owned U.S. patent application Ser. No. 13/666,543, filed on Nov. 1, 2012, which is a continuation of, and claims priority to, commonly owned U.S. patent application Ser. No. 12/163,631, filed on Jun. 27, 2008, and issued as U.S. Pat. No. 8,315,786, the contents of both being incorporated by reference herein.

TECHNICAL FIELD

The subject specification relates generally to the sharing of information that is sensed on personally-held devices and vehicles for larger systems that provide populations with services based on the aggregation of such sensor data. A key example and application of the methods is in the sharing of sensed vehicle velocity and location information for use in systems that provide traffic monitoring and routing services, and in particular to regulating the sharing of sensed information from the vehicle with a service that could make use of the data.

BACKGROUND

Computer-driven route planning applications are utilized to aid users in locating points of interest, such as particular buildings, addresses, and the like. Additionally, in several existent commercial applications users can vary a zoom level, thereby enabling variation of context and detail as a zoom level of a map is altered. For example, as a user zooms in on a particular location, details such as names of local roads, identification and location of police and fire stations, identification and location of public services, such as libraries, museums, and the like can be provided to the user. When zooming out, the user can glean information from the map such as location of the point of interest within a city, state, and/or country, proximity of the point of interest to major freeways, proximity of the point of interest to a specific city, and the like. In some applications, satellite images can be utilized to provide users with additional detail regarding a particular geographic location or region. For example, a prospective purchaser of a house can obtain an overhead satellite image of the house, thereby enabling the prospective purchaser to view lines of occupation, proximity of the house to other adjacent houses, and other information that can be pertinent to the user.

Furthermore, conventional computer-implemented mapping applications often include route-planning applications that can be utilized to provide users with directions between different locations. Pursuant to an example, a user can provide a route planning application with a beginning point of travel and an end point of travel (e.g., beginning and ending addresses). The route planning application can include or utilize representations of roads and intersections and one or more algorithms to output a suggested route of travel. These algorithms can output routes depending upon user-selected parameters. For instance, a commercial route planning application can include a check box that enables a user to specify that she wishes to avoid highways. Similarly, a user can inform the route planning application that she wishes to travel on a shortest route or a route that takes a least amount of time (as determined by underlying algorithms). Over the last several years, individuals have grown to rely increasingly on route planning applications to aid them in everything from locating a friend's house to planning cross-country road trips.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Vehicles and people within them commonly retain a number of devices (e.g., navigation systems, personal digital assistants, cell phones) with sensors that can be used to gather a plurality of information relating to vehicle operation, user condition, and the like. Examples of information that can be gathered include velocity information as well as location information. According to an aspect of the disclosed innovation, the velocity information (e.g., commonly in conjunction with location information) can be used to create direction sets for individual users, predictive traffic models, and the like.

Sharing of location and velocity information can be valuable to a system that is pooling such probe information from multiple vehicles. However, such data also can violate preferences about privacy of owners of the vehicles or sensors and also impose power usage required for running a potentially battery-operated sensor. Furthermore, the cost of delivering or receiving information over a wide area wireless network such as a cellular network can be high. Thus, it can be valuable to limit the sharing of data so data is shared within the constraints of the set of preferences on privacy, network usage costs are minimized, and power usage held by the owner of the sensors. In addition, velocity information transfer can be limited based upon available communication bandwidth. One approach to limiting the sharing is via the use of sharing policies that are based locally, but that can optionally listen to broadcasted needs for data about particular regions from a central system or a shared distributed system that can compute when data from particular locations would be most valuable, and that also can be alerted to suppress sending redundant data when data in response to a broadcast request has been received from another vehicle or device.

A vehicle or device carried within the vehicle with locally-encoded sharing policies can include logic or inferential models that determine if there is an appropriate instance in which to transmit information. A user that operates the vehicle can be part of a membership group that supplies velocity information and potentially other services to the user providing that she supply her velocity information. The vehicle can obtain a request from other users or from a central system that integrates and redistributes the velocity information to supply velocity information and can contain resolution and privacy components that can determine if the velocity information should be shared and thus transferred. For example, membership in a service or travel group can allow users to invoke a privacy filter that protects users from being tracked or monitored except where and when they wish to share data, but also can require some number of velocities or context-sensitive velocities (e.g., shared about particular regions or road classes of a road network and/or during certain time periods or congestion conditions, etc.) to be shared. If the criteria are met for sharing, and if the user has not yet provided enough velocity information to reach a commitment to share data over time or share enough data so as to retain membership in the travel group, then the determination is made that the request for data should be honored. A central or local, distributed contact component can enable transmission of the information and a notice can be sent to similarly situated vehicles who may also be available to respond to the request for data instructing the similar vehicles not to respond since redundant information is likely to transfer. Such a contact component can limit the access of redundant information, so as to maximize the value of communication from all members, who can all commit to similar personal budgets for sharing over time, or so as to limit incursions into privacy and to minimize communications when the information is likely to have little value because it is redundant.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
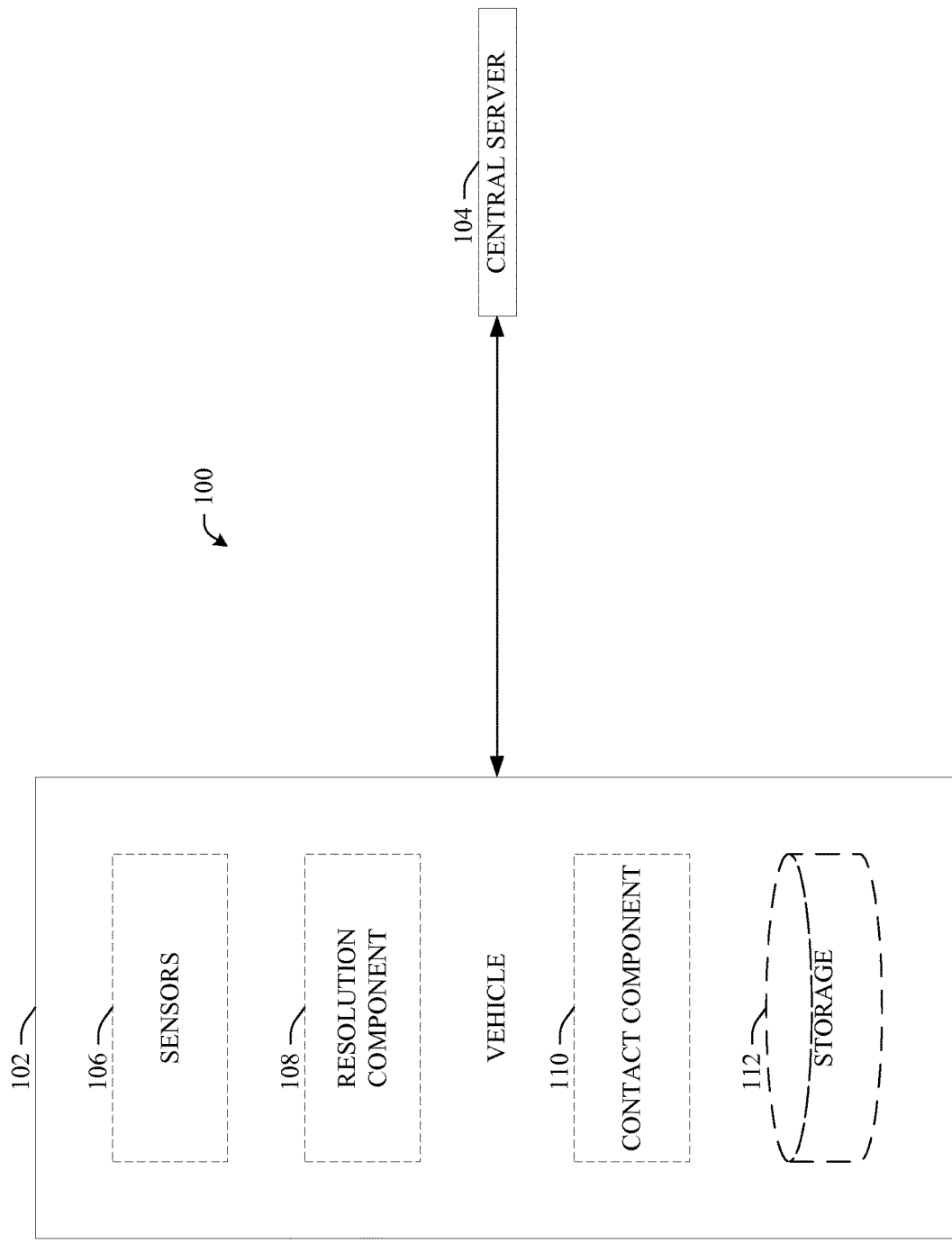
FIG. 1 illustrates a representative system for communication of travel information in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. It is to be appreciated that determinations or inferences referenced throughout the subject specification can be practiced through use of automated learning and/or reasoning techniques.

Now referring to FIG. 1, an example system 100 is disclosed for communicating travel information, including communication of velocity information of a vehicle 102 (e.g., automobile, motorcycle, motor boat, airplane, helicopter, and the like). Conventional vehicle tracking systems transfer vehicle velocity information to a central server 104. For instance, if a user is in an automobile accident, recent velocity information can automatically transfer to the central server 104 and an inference can be made as to a severity of the accident. The disclosed innovation can transfer vehicle velocity information to a central server 104 and/or to other vehicles, where the velocity information can be used to perform traffic routing.

Sensors 106 (e.g., engine, internal and external temperature, tire pressure, tire wear, terrain sensors, vibration, noise, air quality, power meters, fuel sensors, energy levels, energy utilization, user stress, user feedback, voice recognition, facial recognition, gesture recognition, language parsers, text input etc.) are employed to collect information relating to the vehicle 102, a driver, passengers, environment, etc. Among the sensed information (e.g., travel information can include at least a portion of sensed information) can be location and velocity information of the vehicle 102 as sensed by such sensors as a global positioning system device, radio or cellular signals, accelerometers, and such "dead-reckoning" tracking such as the rotation of tires and the configuration of steering, as well as others. Local knowledge of the road network (e.g. using a map database on a global positioning system device) can be used to further refine the sensed location, direction, and lane usage (e.g. if a vehicle follows a freeway interchange, the velocity information can be identified as pertaining specifically to the lane required to make the interchange). Velocity information can include current or history of locations joined with the current or history of velocities of the vehicle 102, acceleration of a period of time, acceleration across a distance, and the like.

A resolution component 108 can determine if travel information (e.g., velocity information, location information, etc.) should be transmitted to an auxiliary entity. People can consider velocity information personal data that they do not want broadcast. Due to this concern, selection can occur if the velocity information should be transmitted. For instance, the resolution component 102 can operate in a pull model, where information is extracted by the auxiliary entity, such as the central server 104. A request for velocity information can transfer from the central server 104 to the vehicle 102 and the resolution component 108 determined if the request should be granted. For instance, the resolution component 108 can balance a level of need for the information of the auxiliary entity against a desire of a user to keep velocity information private. A contact component 110 can enable emission of the travel information if it is determined that the travel information should be emitted. For example, the contact component 110 can send a notice to a transmitter that the velocity information can be transferred.

In an alternative embodiment, the resolution component 108 can operate in a push model, where travel information is willingly transferred to an auxiliary entity. In an illustrative instance, the resolution component 108 can use a timer circuit to measure how long a period passes since a previous transmission of velocity information. If enough time passes, then the resolution component 108 can determine that an update should be sent and the contract component 110 can be instructed to enable emission of the update. In another illustrative instance, the resolution component 108 can reference knowledge of the road network (e.g. using a map database on a global positioning system device) to measure when the vehicle has traversed to a new road segment for which traffic data can be reported. If the vehicle has traversed to a new road segment as stored in the map database, the resolution component 108 can determine that an update should be sent and the contract component 110 can be instructed to enable emission of the update. Commonly, the travel information is velocity information of a vehicle that associates with the resolution component and the contact component (e.g., the resolution component and contact component are integrated upon the vehicle, located upon a device in communication with the vehicle, on a personal electronic device of a user located within the vehicle, etc.)—the velocity information can include speed of the vehicle 102, rate of speed of the vehicle 102 over time, location information of when velocity is measured, and the like.

A balance can occur between a desire of a user to keep travel information private against a desire of a central entity to obtain specific travel information. Local policies can be used in regulating travel information distribution, commonly based upon a desire of a user to keep information private. However, the central server 104 and/or other local vehicles can posses a strong desire to obtain the velocity information. Therefore, balancing can occur between an interest of a user against a collective interest to collect information. The local policy can be programmed by a user, inferred through observation of user tendencies, and the like—in an example, a user can set the policy such that travel information is not disclosed unless a speed of the vehicle 102 is below a threshold percentage of an expected speed (e.g., a speed limit, a contextual speed such as during heavy traffic, etc.). In an alternate example, a user can set the policy such that if the velocity of the vehicle 102 is above the posted speed limit, the velocity reported is not the user's true velocity but instead the posted speed limit. Such a policy would limit the user's legal liability incurred by participating in such a system, and reduce privacy concerns for the user.

In an illustrative example, a request can be made by the central server 104 to collect velocity information of a particular vehicle. The resolution component 108 can analyze the request in addition to contextual data, such as how much information the vehicle 102 has previously provided, time of day, other vehicles available, and the like. Based upon the analysis, a determination can be made on if travel information should be disclosed.

In one example set of policies, data is not transmitted and is only considered for transmission when the current locally sensed velocity of a vehicle differs significantly (e.g., is lower or higher by some threshold) from the velocity that is known by a local system or determined by the local system to be the velocity that is expected by a larger, shared system that aggregates and distributes current velocity information from all vehicles in the region where the vehicle is sensing or is employing predictions about velocities in a region. For example, the local policy can assert only transmit data when the current speeds are slower by at least a threshold factor based (e.g., a vehicle travelling about 35 miles per hour in a 55 mile per hour zone or a zone that is expected to be wide open and flowing at 50-65 miles an hour at a current time, on Saturdays at 2 pm, local time, as captured in statistics that are stored locally) on a type of road than the expected speeds for that location or road segment(s) as accessed in a table of context-sensitive speeds available to the local devices or via a live broadcast from a central system about traffic in the region where a vehicle is sensing. Computed differences between sensed and expected velocity can be based on the difference between the sensed velocity and speeds that can be inferred locally by a predictive model, that infers expected speeds based on multiple factors, including contextual factors (e.g., time of day, day of week, weather, accidents up ahead, etc.) and road properties (posted speeds lanes, etc.), and that is known to be used by a central service or other members of service, or as tables of predicted speeds computed as simple functions of posted speeds that define speed limits. In an illustrative instance, if a sensed velocity is relatively high, but contextually is estimated that velocity should be low (e.g., it is during rush hour), then the resolution component 108 can transfer the sensed velocity as travel information.

Other local policies for sharing include referring to a locally stored table of highly-variable regions of a highway system or regions that tend to vary greatly during particular times of day and days of week, or based on other contextual cues. Such contextual cues can be sensed locally and then can alert the system 100 (e.g., the vehicle 102 and/or central server 104) that current velocity information will likely be of value. More measures of information value than using the overall raw variance at the current region of a road network being traversed, include variances that are conditioned on the current context (e.g., time of day, day of week, weather, etc.), and other pre-computed quantities including, more formal measures of current information value of location and velocity information, including statistical measures of surprise that a system observing the region would have in learning about the current flow and computations of the formal expected value of information of sharing the current velocity, as well as measures that are transformed or re-weighted by the importance of the current or future segments per, e.g., the frequency of usage of the segment in the transportation or routing considerations of populations of drivers. Local decisions can be based on such criteria as those described throughout the subject specification and can be used together with centrally generated queries for data.

Different pieces of information, such as collected materials, component operating instructions (e.g., of the resolution component 108), historical travel information, etc. can be held on storage 112. Storage 112 can arrange in a number of different configurations, including as random access memory, battery-backed memory, hard disk, magnetic tape, etc. Various features can be implemented upon storage 112, such as compression and automatic back up (e.g., use of a Redundant Array of Independent Drives configuration).

Figure 2:
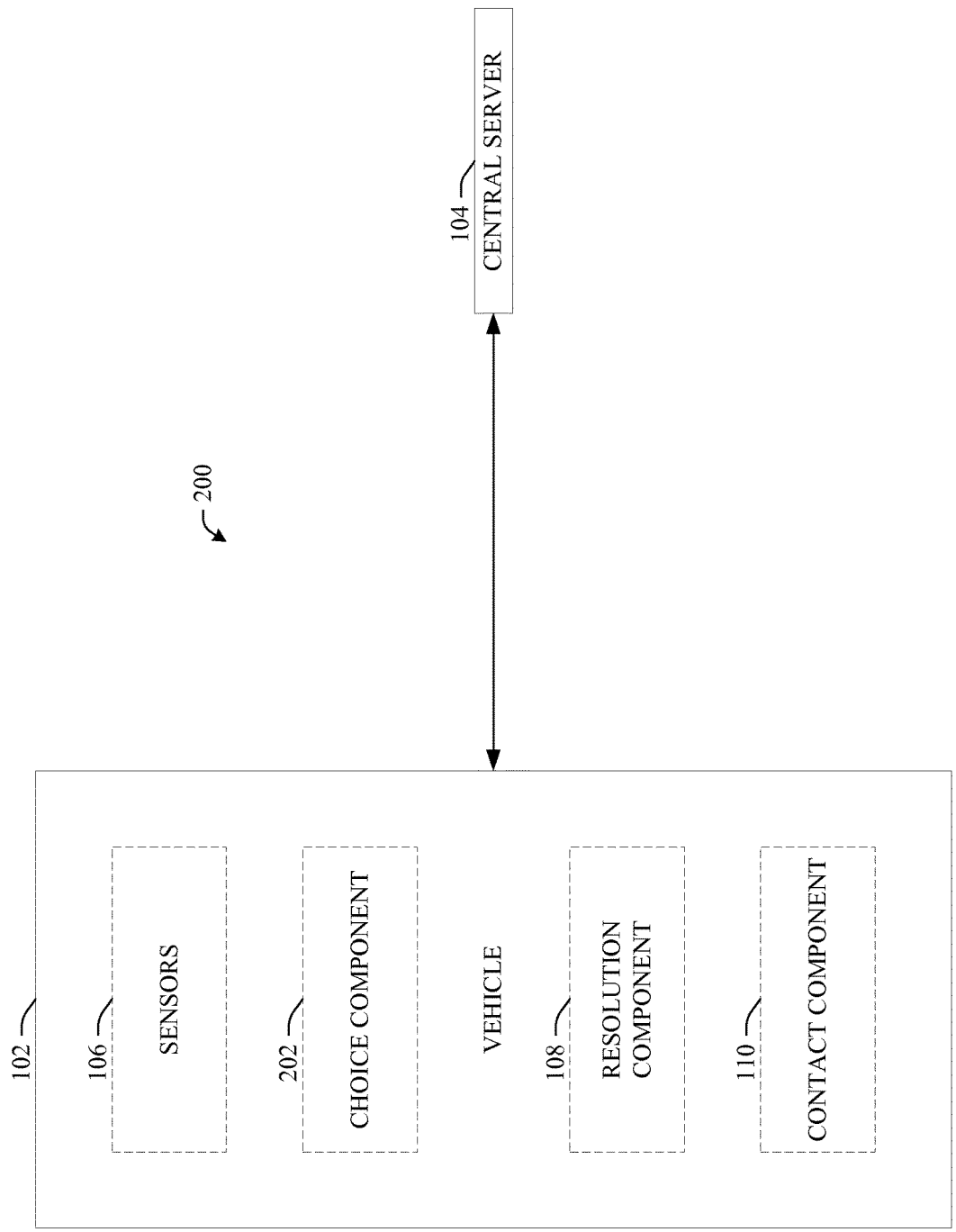
FIG. 2 illustrates a representative system for communication of travel information highlighting a choice component in accordance with an aspect of the subject specification.

Now referring to FIG. 2, an example system 200 is disclosed for communication of travel information to an auxiliary entity through use of a choice component 202. A vehicle 102 can be in communication with a central server 104 such that velocity information can transfer between two entities. Sensors 106 can measure the velocity information and retain the measurement in storage 112 of FIG. 1.

A choice component 202 can select at least one instance when the travel information should be transmitted, the resolution component 108 determines if the travel information should be transmitted as a function of the selection. According to one embodiment, the travel information is velocity information of a vehicle 102 that associates with the resolution component 108 and a contact component 110 and at least one instance is selected when velocity of the vehicle 102 is above, at, or below a threshold. Through predictive models, the central server 104 can estimate how many vehicles pass through a specific area during a set time. An assumption can be made by the central server 104 that if no notices are transmitted, then vehicles are operating at expected speeds. The choice component 202 can function such that if the vehicle has a velocity v at x percent above or below a posted speed limit, then the contact component 110 can enable emission of the velocity v in conjunction with a location where velocity v is taken. The central server 104 can process a transmission and used the velocity v as indicative of traffic patterns for traffic routing purposes. For instance, a low velocity can be indicative that traffic is heavy and vehicles should be routed away from an area and a high velocity can be indicative of little traffic, thus vehicles should be routed to the area. According to an alternate embodiment, the travel information can be velocity information of a vehicle 102 that associates with the resolution component 108 and the contact component 110 and at least one instance is selected when a measured velocity is against an anticipated velocity derived from a predictive traffic model. The contact component 110 can function to enable emission of the travel information if it is determined that the travel information should be emitted.

According to one embodiment, the travel information is velocity information. Velocity information can be selected based on difference of current velocity and anticipated velocity derived from posted speeds, an expected speed for the road segment that is transmitted from a central service, a stored table of velocities, use of a predictive traffic model, or a combination thereof. Additionally, historical variance of road speeds of a region overall or based on the current or related context can be employed in the determination to share velocity information. Moreover, a measure of expected value of information or expected value of information weighted by usage of a segment can be used in the determination to share velocity information.

Historical or estimated densities of vehicles on roads, in conjunction with a characterization of prevalence of membership in the use of an aggregation service in a region, can be used to compute a likelihood that traffic is flowing per expectation, when reports are not received for a specified observation period. That is, the central server 104 can compute a likelihood that not hearing information about unexpected flows on a road segment means that traffic is flowing and within bounds of the predicted, posted speed, broadcasted, average speeds, or other data that is being used as a reference point.

Figure 3:
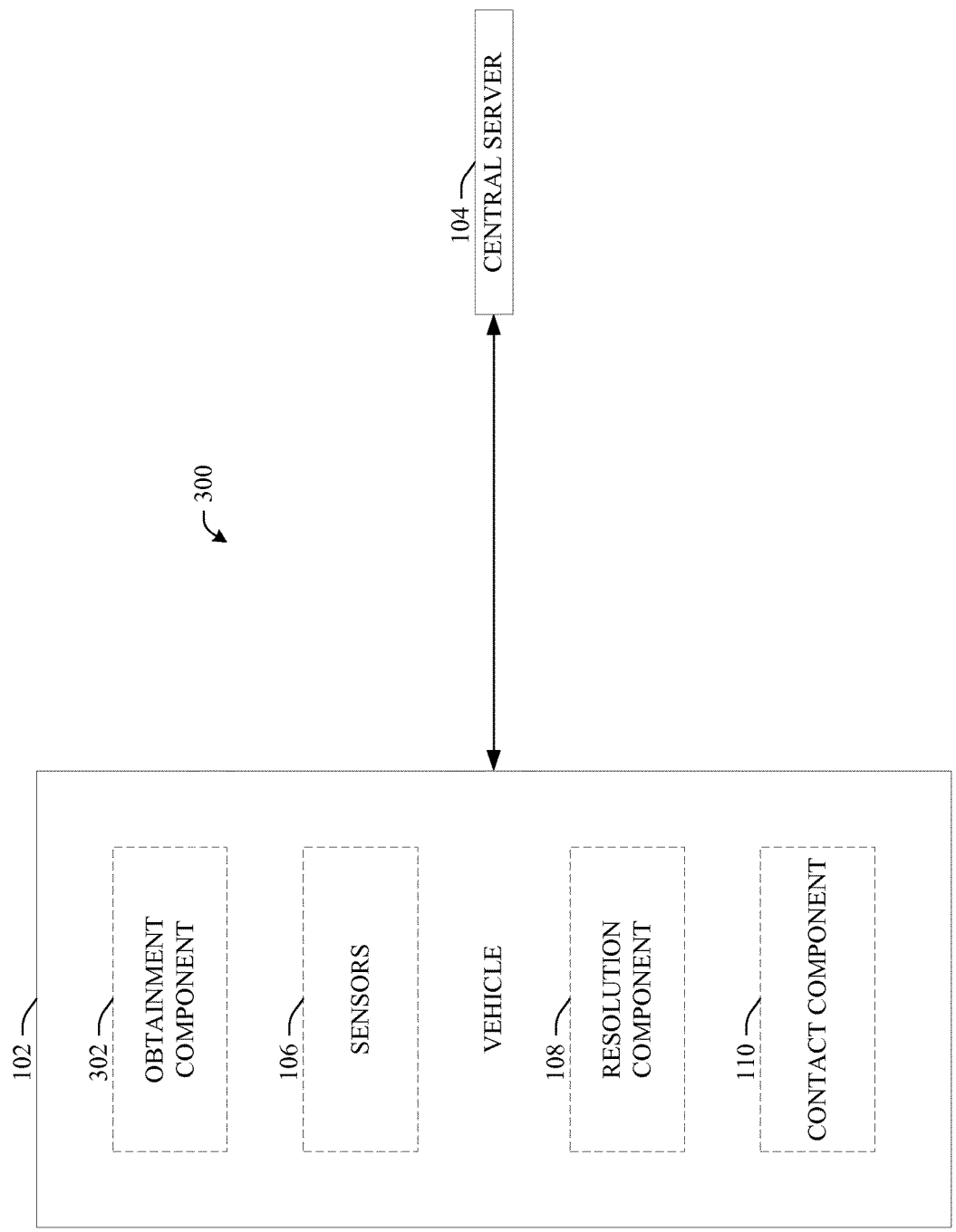
FIG. 3 illustrates a representative system for communication of travel information highlighting an obtainment component in accordance with an aspect of the subject specification.

Now referring to FIG. 3, an example system 300 is disclosed for transmitting travel information concerning a vehicle 102 to an auxiliary entity such as a central server 104 through use of an obtainment component 302. The central server 104 can transmit a request to the vehicle 102 for travel information such as a current or historical velocity of the vehicle 102. The obtainment component 302 can collect and process a request. Processing the request can include identifying metadata associated with the request, such as a name of an entity that sent the request, determining when the request is sent, authenticating the request, and the like. For example a request can be received by the vehicle 102 in a region stating "there is a need for anyone who is on road R traveling north between location x and location y to provide velocity information." According to one embodiment, the travel information (e.g., velocity information) is emitted at a random time after collection of the request within a specified tolerance (e.g., within about one minute of receiving a request).

According to one embodiment, once the request is received sensors 106 (e.g., one or more sensors) can obtain velocity information. However, it is possible for the sensors 106 to gather information continuously and information is designated for transfer upon reception and/or successful processing of a request via the obtainment component 302. The resolution component 108 can determine if the travel information should be sent—for instance, successful processing by the obtainment component 302 can indicate that velocity information should be transferred to the central server 104. A contact component 110 can enable emission of the travel information if it is determined that the travel information should be emitted. Once a response is transmitted by the vehicle 102, a notice can be sent to other vehicles of the transmission thus allowing the other vehicles to retain privacy information. The notice can be sent by the vehicle 102 upon transmission, by the central server 104 after successful collection of velocity information, and the like. In addition, information validation can occur to determine if transferred information is credible before other vehicle suppress information.

According to another embodiment, a general broadcast can be updated to reflect traffic status. Multiple vehicles in one area can send velocity information to a central server, where the central server processes the information and transfers the information to other vehicles and/or uses the information to create travel routes for vehicles. Velocity information can be compared against one another to determine if there is significant variation among results as well as compared against information of a digital service. If there is not specific variation, then vehicles can choose stop sending information. However, in some situations, it can be desirable to have redundant data, so information can still be collected even if redundant. For example, one vehicle travelling slowly might not be indicative of an overall traffic pattern change, so information can still be collected to determine if there is an actual change or an isolated incident. Additionally, some velocity information can be ignored, such as vehicles that are at a toll booth, vehicles that a stopped due to mechanical problems, high-occupancy vehicles, and the like. Moreover, information from certain vehicles can be weighted—if a long-haul truck typically travels about ten miles per hour less than an average speed of other vehicle, velocity information of the long-haul truck can be increased by about ten miles per hour.

Figure 4:
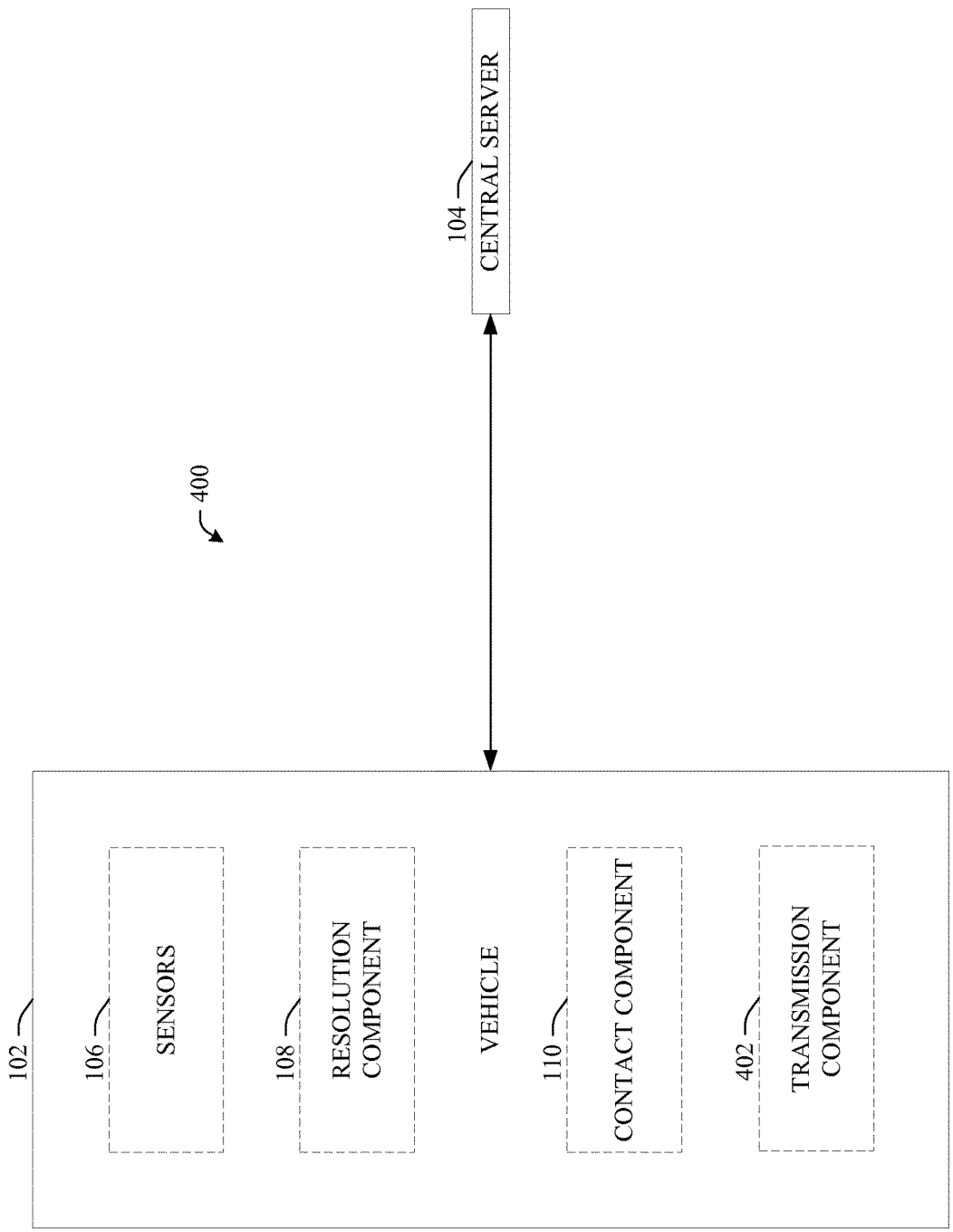
FIG. 4 illustrates a representative system for communication of travel information highlighting a transmission component in accordance with an aspect of the subject specification.

Now referring to FIG. 4, an example system 400 is disclosed for transferring travel information to an auxiliary entity through use of a transmission component 402. A vehicle 102 can be in communication with a central server 104, nearby vehicles via an ad-hoc network connection, or another auxiliary entity. Sensors 106 can measure various travel data including velocity information of the vehicle 102. The sensors 106 can automatically gather data or selectively gather information in accordance with explicit instruction (e.g., instruction that is part of the request collected by the obtainment component 302 of FIG. 3).

A resolution component 108 can determine if travel information should be communicated to another entity. If a positive determination is made by the resolution component 108, then a contact component 110 can enable emission of the travel information. With the enabled emission, a transmission component 402 can emit the travel information to the auxiliary entity. Transmission can occur wirelessly and since some travel information can be considered personal, various measures can be implemented in order to secure privacy. For instance, velocity information that is emitted from the vehicle 102 can be encrypted, and any identifying information can be removed for the purposes of velocity sharing.

According to one embodiment, the transmission component 402 transfers a suppression notice to at least one supplemental vehicle, the resolution component 108 and contact component 110 associate with a primary vehicle (e.g., the vehicle 102). If one vehicle transfers velocity information, then it could be redundant for other vehicles to send similar information (e.g., many vehicles in an area slow below a threshold). Therefore, when one vehicle successfully sends information, a notice can be sent to other vehicles that there is no need to send the same information.

Figure 5:
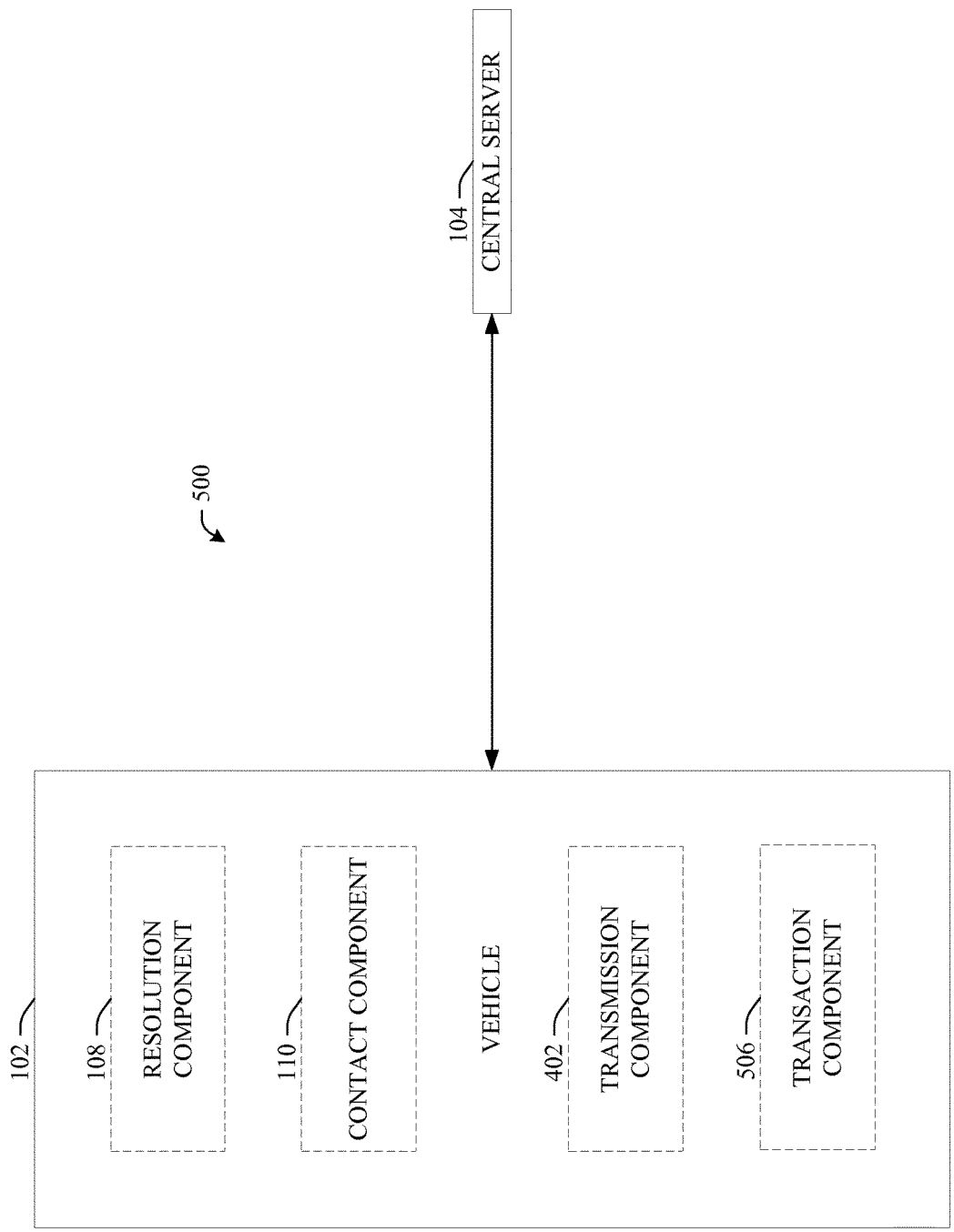
FIG. 5 illustrates a representative system for communication of travel information highlighting a transaction component in accordance with an aspect of the subject specification.

Now referring to FIG. 5, an example system 500 is disclosed for rewarding a user for disclosing velocity information. Sensors 106 of FIG. 1 can be used to track velocity information of a vehicle 102. Commonly, the tracking of velocity information occurs as a result of an auxiliary entity, such as a central server 104 that intends to use the information for traffic routing purposes. A resolution component 108 can determine if velocity information should be transmitted and a contact component 108 can enable transmission if a positive determination is made.

A transmission component 402 can emit velocity information to the central server 104, to another vehicle, and the like. The vehicle 102 can include a transaction component 502 that performs a reward function in relation to emission of the travel information, the reward function includes transfer of money to an account associated with a user, transfer of a pathway toll credit, transfer of points that can be used to obtain a product or service, continued access to system-wide traffic information and other local services, and the like. According to one embodiment, the transaction component 502 can be in communication with a central server 104 that functions as a bank, credit card company, governmental organization, etc.

Figure 6:
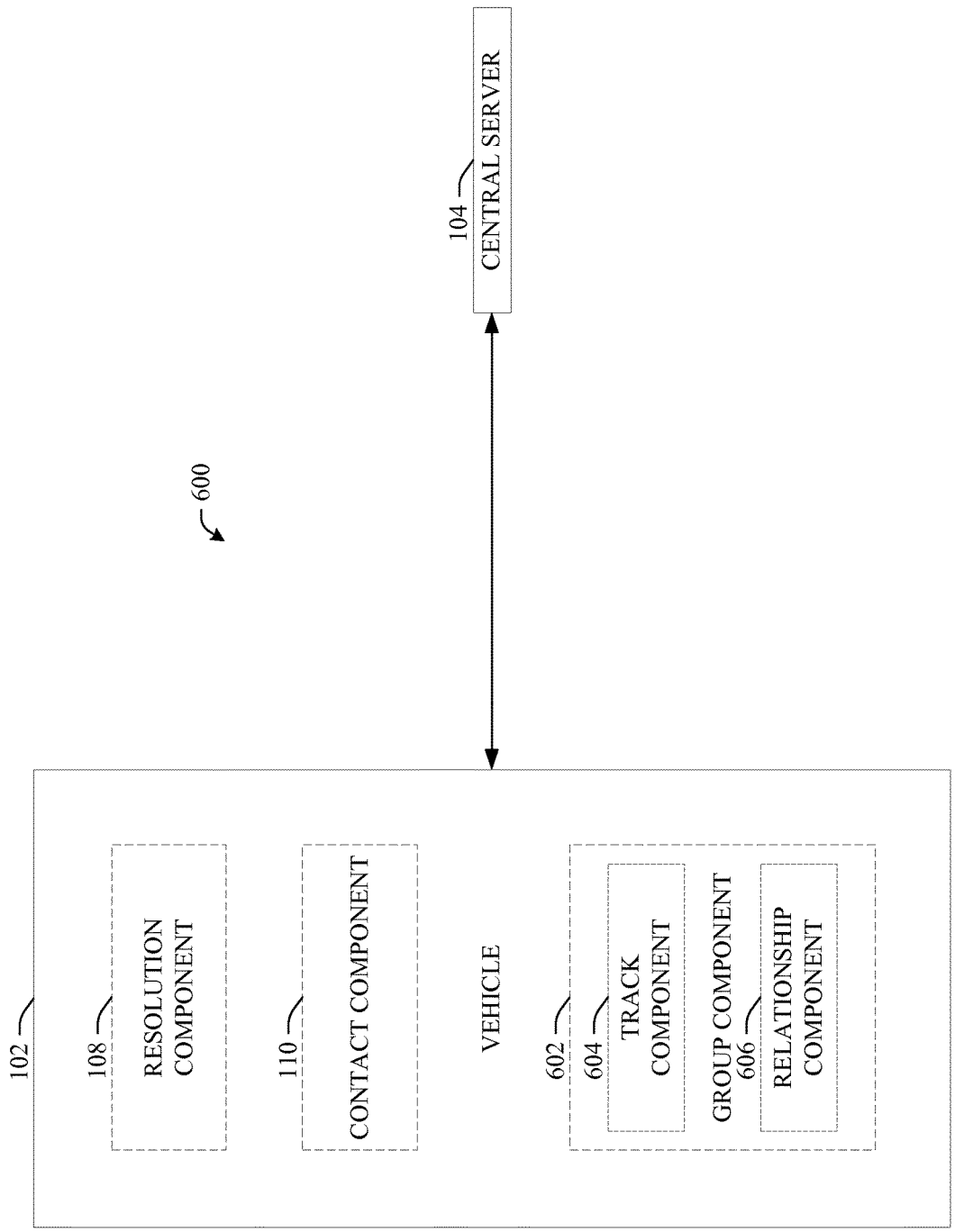
FIG. 6 illustrates a representative system for communication of travel information highlighting a group component in accordance with an aspect of the subject specification.

Now referring to FIG. 6, an example system 600 is disclosed for facilitating membership in a group that shares travel information. A vehicle 102 can determine that velocity information should be gathered thought use of sensors 106 of FIG. 1. A request can be collected that the velocity information should transfer to a central server 104. If the request is authenticated and it is determined that the velocity information should be transferred, then a contact component 108 can enable transmission (e.g., turn a transmitter to an 'on' state).

Since some travel information, such as velocity information, can be considered private, incentives can be used to encourage a user to share such information. A group component 602 can facilitate a user of a vehicle to be part of an information sharing group. By sharing her information, the user can become a group member and be entitled to receive travel information of other vehicles. For example, if the user supplies her velocity y times a month, then she is a member and received information from other members. In an alternate example, members of a group may be able to pay discounted rates for system-wide traffic and other services in exchange for increased sharing of information to the system.

A track component 604 can measures a number of instances the transmission component 402 of FIG. 4 emits the travel information. A relationship component 606 can determines if the number of instances is at or above a threshold that enables the vehicle 102 associated with the resolution component 108 and contact component 110 to gain membership in a travel group. Oftentimes, membership in the travel group enables the vehicle 102 to gather travel information (e.g., velocity information) that concerns at least one other vehicle of the travel group, or travel information derived from other conventional sources, or other services altogether.

Determinations and/or inferences discussed throughout the subject specification can occur through artificial reasoning and/or learning techniques. Automated reasoning and/or learning techniques can employ one of numerous methodologies for learning from data and then drawing inferences and/or making determinations related to applying a service (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as with the use of formal theorem proving systems or more heuristic rule-based expert systems that reason via the chaining of If-Then rules.

Figure 7:
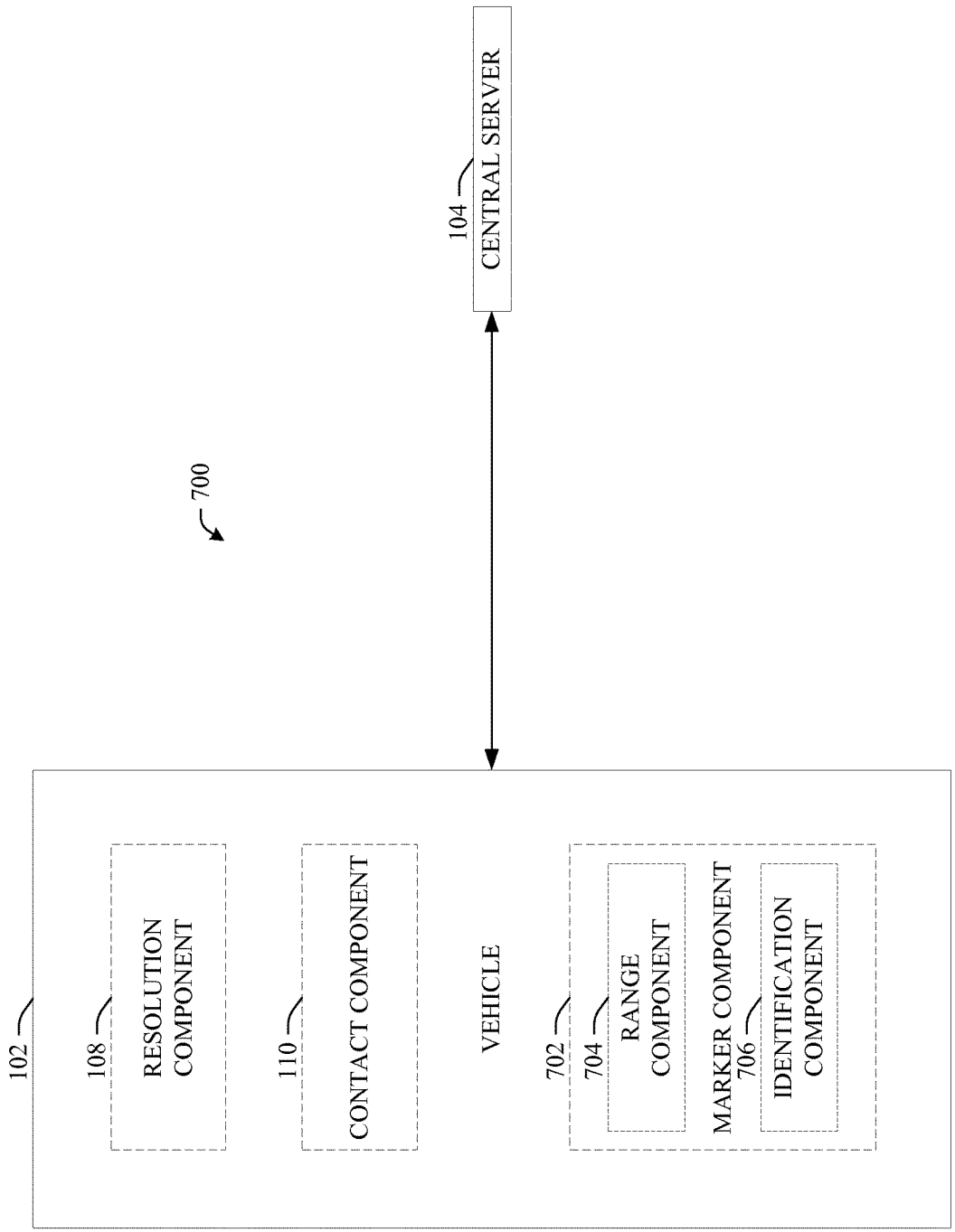
FIG. 7 illustrates a representative system for communication of travel information highlighting a marker component in accordance with an aspect of the subject specification.

Now referring to FIG. 7, an example system 700 is disclosed for using personal landmarks in a manner to regulate information transmission. A vehicle 102 can receive a request from a central server 104 to collect velocity information. Sensors 106 of FIG. 1 can measure the information and a resolution component 108 can determine if the measured information should transfer to an entity identified by the central server 104. If it is determined that the velocity information should be transferred, then a contact component 110 can enable communication.

One manner to regulate if velocity information should transfer is through use of personal and more general landmarks. Personal landmarks can be considered private areas where it is assumed a user does not desire to have her velocity information broadcast. For example, an individual's home or a radius of several miles around a home can be considered a personal landmark or personal region defining a location or area where a user wants certain information kept private.

A marker component 702 can facilitate use of landmarks with regard to disclosure of travel information. According to one embodiment, the resolution component 108 can operate such that velocity information is not transferred if the vehicle 102 is within a distance of a personal landmark (e.g., a certain distance, number of city blocks, and the like). A range component 704 can obtain a distance from a personal landmark. If the vehicle 102 associated with the resolution component 108 is within a standard distance from the personal landmark, then it is automatically determined that the travel information should not be transmitted.

The marker component 702 can also function to create new landmarks when appropriate. An identification component 706 can designate a location as a personal landmark through measurement of an amount of time a user, the vehicle 102 associated with the resolution component 108 and contact component 110, an entity that retains the resolution component 108 and contact component 110, or a combination thereof spends at a location. For example, a user could spend a relatively long time at a house of his girlfriend and an inference can be made that the house should be a personal landmark based upon the time he spends at the house.

Figure 8:
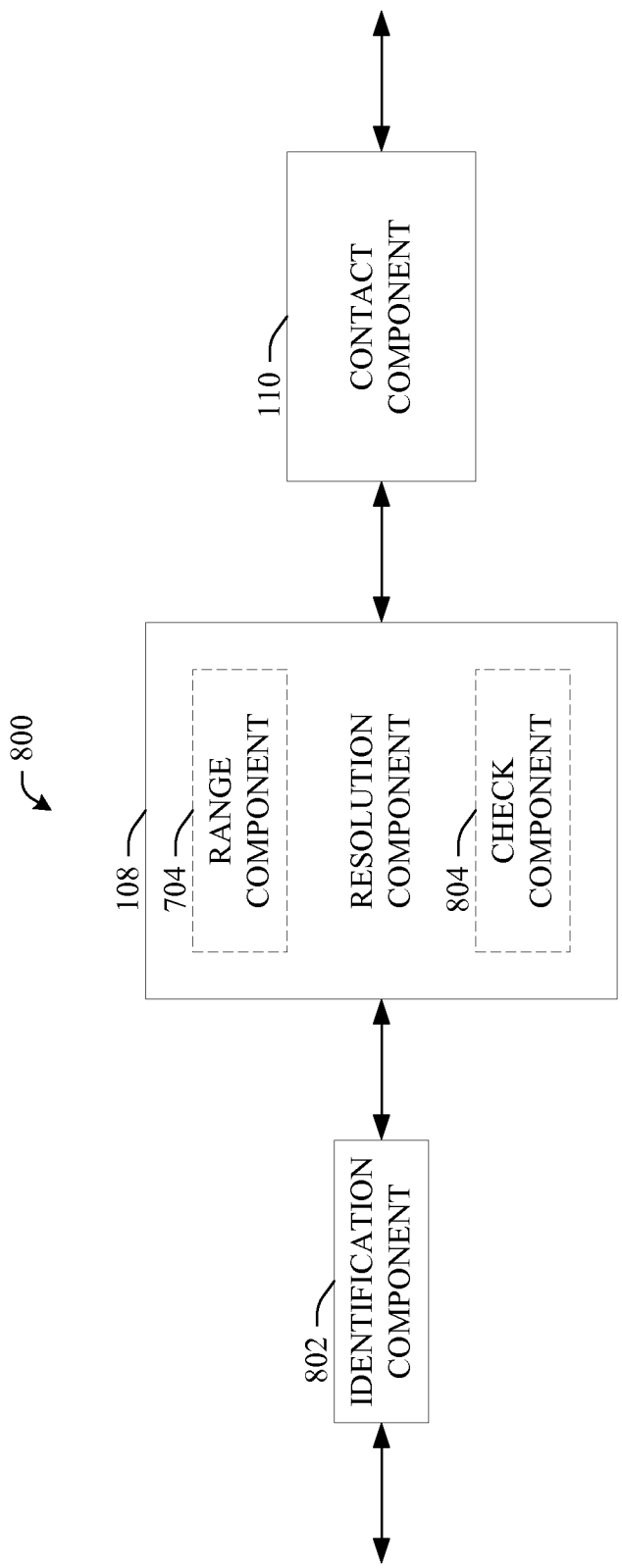
FIG. 8 illustrates a representative system for determining if travel information should be transmitted in accordance with an aspect of the subject specification.

Now referring to FIG. 8, an example system 800 is disclosed for regulating velocity information transfer in relation to a vehicle (e.g., the vehicle 102 of FIG. 1). An identification component 802 can identify an appropriate instance for transmission of velocity information concerning a vehicle—commonly through, comparison with velocity information known system-wide, receiving a request, reference to knowledge of the road network (e.g. from a map database), or through use of a timing circuit. The identification component 802 can operate as means for identifying that velocity information of a vehicle should be transmitted to an auxiliary entity through comparison of a sensed velocity against a threshold.

A resolution component 108 can determine if the velocity information should be transmitted. A range component 704 can measure a distance a vehicle associated with the system 800 is from at least one personal landmark. The range component 704 can function as means for determining if the vehicle is within a specified range of a personal landmark. In addition to determining if there is a personal landmark that can dictate velocity information transfer, a check component 804 can determine if there is a suppression instruction from another vehicle and/or compare velocity information against information from another vehicle to determine if there is redundancy and therefore additional information is not needed, would waste processing resources, and the like. The suppression instruction and/or comparison can be evaluation to determine relevancy, freshness, and the like. The check component 804 can implement as means for checking if there is an instruction from a supplemental vehicle that velocity information should not be transmitted. If it is an appropriate action, such as there is no nearby personal landmark or suppression instruction, then the contract component 110 can enable communication of velocity information. The contact component 110 can operate as means for enabling the velocity information to be transferred if the vehicle is not within the specified range and there is not an instruction from a supplemental vehicle.

Figure 9:
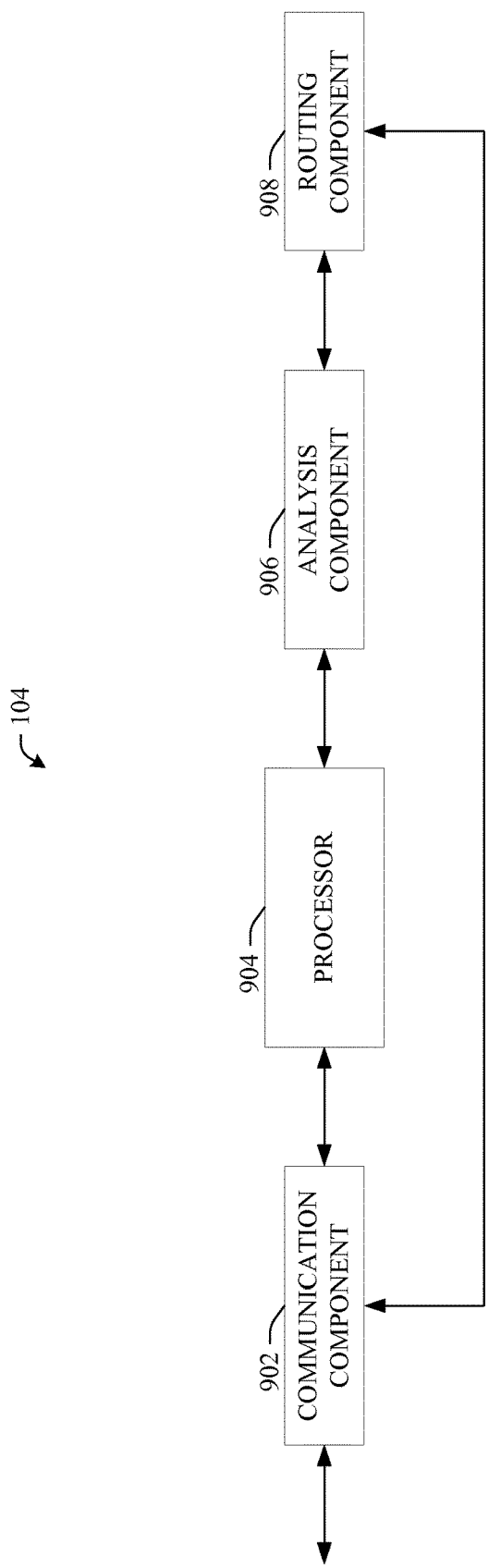
FIG. 9 illustrates a representative central server in accordance with an aspect of the subject specification.

Now referring to FIG. 9, an example central server 104 is disclosed. A communication component 902 can engage with at least one vehicle to learn velocity information. Operation can take place wirelessly, in a hard-wired manner, using employment of security technology (e.g., encryption), etc. Information transfer can be active (e.g., query/response) or passive (e.g., monitoring of public communication signals). Moreover, the communication component 902 can utilize various protective features, such as performing a virus scan on collected data and blocking information that is positive for a virus.

A processor 904 (e.g., a processor operatively coupled to storage) can perform actions upon a received response and/or determine a manner in which to make a request for travel information. For example, a plurality of information can transfer from a vehicle to a central server, including vehicle identification details, travel information, and the like. The processor can extract desirable information, such a velocity of a vehicle that sends a response and freshness of the response. Additionally, the processor 904 can determine a region of interest and request that at least one vehicle in the region of interest respond with velocity information (e.g., a region is determined based on freshness of information).

An analysis component 906 can evaluate the velocity and make at least one inference or determination based upon the velocity. For example, a vehicle that is below a threshold can indicate a particular route is experiencing traffic congestion problems. A routing component 908 can alter a direction set for a user base upon the velocity and/or a result of the analysis. For example, if a route is inferred to be congested, then the routing component 908 can alter a direction set to avoid the congested route. The communication component 902 can be employed to transfer the altered direction set.

It is to be appreciated that components disclosed in the subject specification can be applied to the central server, even when shown as part of a vehicle. For example, a central server 104 can have a transmission component that is similar in functionality to the transmission component 402 of FIG. 4. Moreover, an ad-hoc mesh network of vehicles can also be used (e.g., a network that functions without a central server that is organically created, maintained, etc.). Additionally, while FIG. 9 highlights components as part of a central server 104, it is to be appreciated that functionality can occur as part of other units. For instance, the routing component 908 can implement upon a vehicle (e.g., the vehicle 102 of FIG. 1) or a personal electronic device such as a cellular telephone and locally manipulate a direction set.

As opposed to monitoring vehicles, the central server 104 can operate using a polling or query-response configuration. As opposed to continuously monitoring vehicles, which would impose on the privacy of individuals in vehicles, the central server 104 can determine an appropriate time to collect travel information, commonly based on historical data, contextual information, and such computations as value of information and the like. A query for information can be transmitted to multiple vehicles. If a vehicle answers, then the central server 104 can process the response and send a supplemental transmission instructing other vehicles not to transfer travel information. In an alternate embodiment, the central server 104 can collect information and not send a suppression instruction—the central server 104 limits information broadcast and thus implements implicit suppression. Thus, information of only one vehicle is obtained and privacy of many other vehicles can be kept. According to one configuration, the query can be directed to vehicles within a region per requests for queries that are relevant only to specific coordinates, as determined by locally detected coordinates; however, larger scale and more open-ended broadcasts can be available. In addition, while queries are discussed as part of the central server 104, it is to be appreciated that vehicles can transfer queries among one another to gain information (e.g., continuous queries transferred between vehicles traveling along one road) and to notify other vehicles that data about the flows in the local region have already been transmitted so as to limit the transmission of redundant information from a vehicle and/or central server).

As vehicles locally have data about where they are, they do not need to be monitored in advance by a centralized or distributed traffic monitoring system. Vehicles can make decisions based on the broadcasted queries seeking data about regions or on system-wide knowledge of expected velocities based on reports from other vehicles and/or sources. For example, a query can be received via a wide broadcast about a perceived need for velocity information of any vehicle on a specific road between lat-long x,y and lat-long x',y', between a current time t and some future time t'. Such a need might be computed, e.g., based on a value-of-information computation performed at a central location, that considers other data received and context, as well as historical data. Each vehicle listening to the broadcasts can be able to determine locally whether their data is being sought, and so can share without being monitored in advance. Thus, vehicles do not have to reveal where they are in advance of receiving such a broadcast and each can make a local decision about whether to share velocity and location data that is consistent with the local privacy policy (e.g., within the constraints of personal policies with regard to a budget on sharing data, greater than an minimal preferred inter-time interval, allowable location and velocity for sharing data about location and velocity). The full value-of-information machinery can also be executed locally so as to perform such inferences and deliberation without the need for broadcasts.

Different policies can be employed to minimize acquisition of redundant data from multiple cars in a general region in response to a broadcasted need (e.g., request from a central traffic monitoring and sharing service) and/or locally determined policy (e.g., the sensed velocity is determined to be far slower than the velocity known to be expected at a location via a transmitted or onboard table or prediction). Minimizing information can benefit both a vehicle (e.g., vehicle 102 of FIG. 1) as well as the central server 104. Few vehicles can provide information thus protecting overall privacy and the central server 104 does not need to waste resources processing redundant data.

In one approach, a "redundacy avoidance" policy for transmittal of data is used by having each car wait an amount of time under a deadline that is generated as a function of the output of a random number generator. When the answer to a query has been received from the first vehicle to report the data, a signal, either sent locally to proximal vehicles or transmitted from the central traffic integrator, can tell all other candidate vehicles to withhold the transmission, the sufficient data has been received and that the other data will be redundant. Such a policy can enhance the value of data from each vehicle within budgets and transmission policies as dictated by privacy and power-consumption preferences of each vehicle. Other policies for avoiding the transmission of redundant information from multiple vehicles can be to employ queries for a sequence of more precise location coordinates, such that the chance of more than one car being queried for data is low, and to continue to query for adjacent positions until a vehicle fitting the queried criteria (and with available information per privacy and power preferences) answers the query. That is, given a road segment and heading of interest, a central system can "scan" for a provider of road velocity along its path by issuing queries in sequence for vehicles in subsegments within the segments, traveling up or down the whole segment of interest in terms of the specified desired latitude and longitude values until a vehicle reports data, given its privacy constraints. Given a failure to receive a response, a set of coordinates can be reissued, effectively "rastering" over the pathway as vehicles moving on it, until one vehicle reports.

Such queries can be done in the absence of monitoring of vehicles, but that can still allow vehicles to be asked in real-time or in advance (per predictions of future needs) if they can share data (e.g., sensed data that identifies that road speeds are much slower than the speeds that are expected in a location) in an on-demand manner, a central traffic-monitoring system can issue broadcasted queries for information. These broadcasted queries can be used in conjunction with the local policies for sharing velocity data described throughout the subject specification. Data about velocities at specific regions can be explicitly requested via queries for location-specific velocity data sent by larger-scale broadcasts from a central system—or, in a more distributed system, from one or more specific vehicles that can benefit from proactive information about future road segments that are being considered or are part of current plans. For example, a query can originate from one or more cars that can benefit from the velocity data about regions of a route that they anticipate experiencing or can experience via a forthcoming routing decision. Such cars can be those vehicles trailing a particular vehicle, either on a same road or that expects to traverse the same route at a future time, or that would like to consider that route segment in deliberation about a best route. Requests can be made through local transmissions or brokered through a more central traffic monitoring and coordination system. It is to be appreciated where examples disclose a vehicle type (e.g., car) other vehicles types can be substituted.

Figure 10:
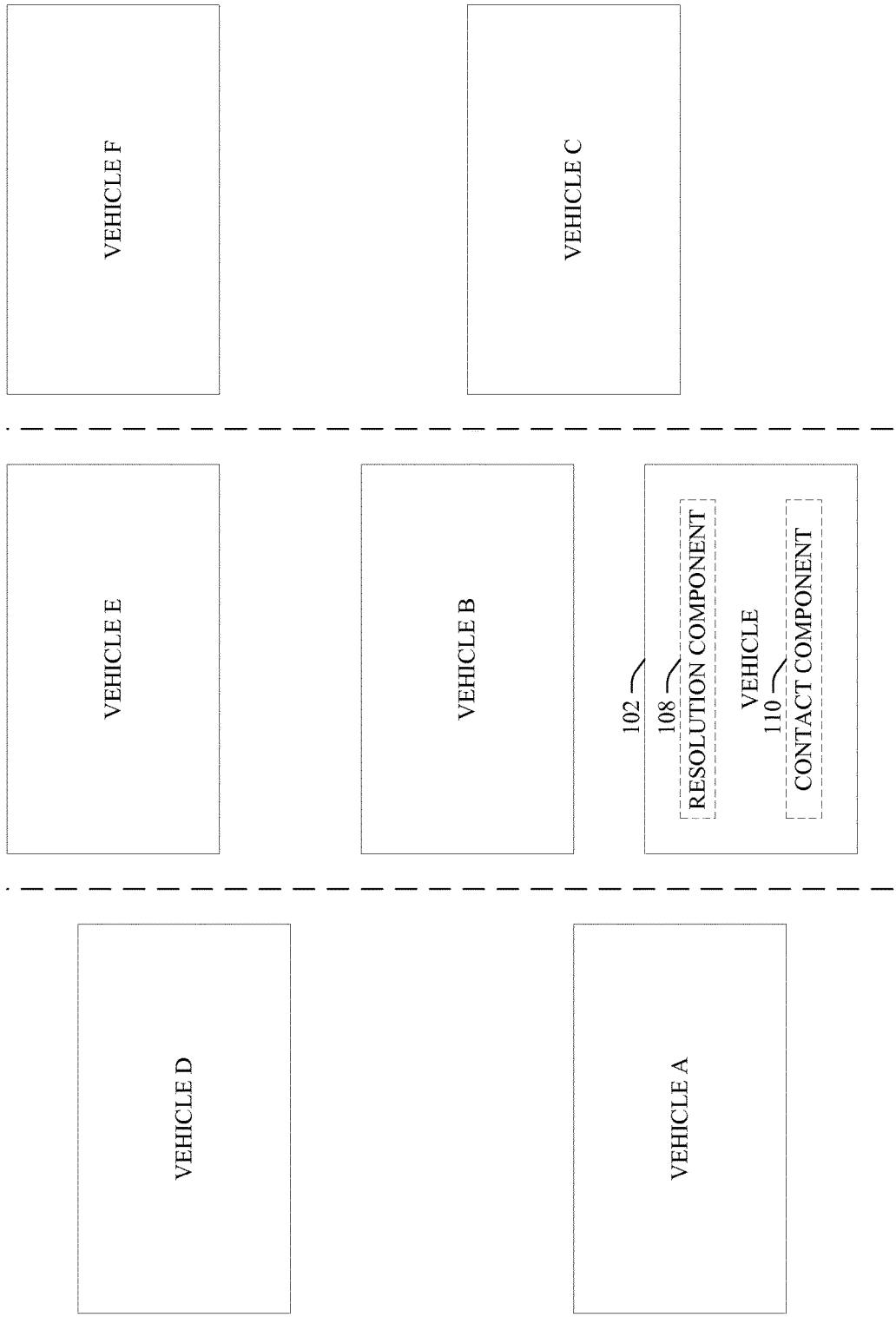
FIG. 10 illustrates a representative multi-vehicle configuration in accordance with an aspect of the subject specification.

Now referring to FIG. 10, an example vehicle configuration 1000 is disclosed in relation to aspects disclosed in the subject specification. A vehicle 102 can retain a resolution component 108 that determines if travel information regarding the vehicle 102 should be transmitted. Commonly, the travel information is velocity information and/or location information. If it is determined that the travel information should be communicated, then a contact component 110 can enable transmission of the travel information.

According to one embodiment, the travel information can be distributed locally to certain vehicles. For instance, six nearby vehicles, designated vehicles A-F, can surround the vehicle 102. Vehicles E and B can be in the same driving lane as the vehicle 102 while the other vehicles are in adjacent lanes. Different standards can be used to determine what vehicles obtain travel information of another vehicle. For example, the vehicle 102 can experience a drastic drop in velocity that goes below a set threshold. A distance standard can be used, such that vehicles A, B, and C are physically close to the vehicle 102 and therefore are provided the travel information. In a different configuration, vehicles B and E that are in a common lane to the vehicle 102 can be provided the information through an inference that vehicles that have a highest chance of influence from the drop in velocity of the vehicle 102 (e.g., lane information is gathered by cameras). Information sharing can also occur as membership of a travel group—if vehicles A, D, and F are part of an information sharing group, then they will be transferred the velocity information while vehicles B, C, and E are not. There can be an override to membership with regard to safety; for instance, even if vehicle B is not part of the membership group it can still receive the velocity information since there is a decline, vehicle B is in the same lane as vehicle 102, and vehicle B and the vehicle 102 are physically close to one another (e.g., there is a relatively high likelihood of an accident).

According to another embodiment, an election can take place to determine a vehicle that should communicate velocity information. For example, of the six vehicles mentioned above, one can be designated to supply information (e.g., selected randomly, through use of an algorithm, through a cyclical queue, etc.). If the six vehicles are travelling at about a same speed, then there can be saving of resources by limiting entities that transmits information. There can also be metadata associated with velocity information—in one instance, a central server can identify six vehicles travelling in about one position (e.g., determined through global positioning) and one of the six vehicles can be designated to supply information. Supplied information can be associated with metadata stating that the reading represents travel of about six vehicles. In addition, security measures can take place to ensure accuracy. For instance, if a rouge vehicle (e.g., a vehicle that sends out a wrong reading) is elected, contextual information can be used to determine if validity of information supplied by the rouge vehicle. One manner is to compare velocity information against a road type (e.g., twelve miles per hour on a highway can be indicative of a rouge vehicle). If there is a relatively high likelihood of a rouge vehicle, then another reading can be obtained from at least one of the other five vehicles.

While aspects are disclosed regarding traffic changes along one road, it is to be appreciated that velocity of one road can be indicative of traffic upon another road. For example, along a first road an accident can occur that causes a massive decrease in traffic. This can be indicative of a future increase in traffic along a second road adjacent to the first road since travelers along the first road are likely to change roads to avoid the accident.

Figure 11:
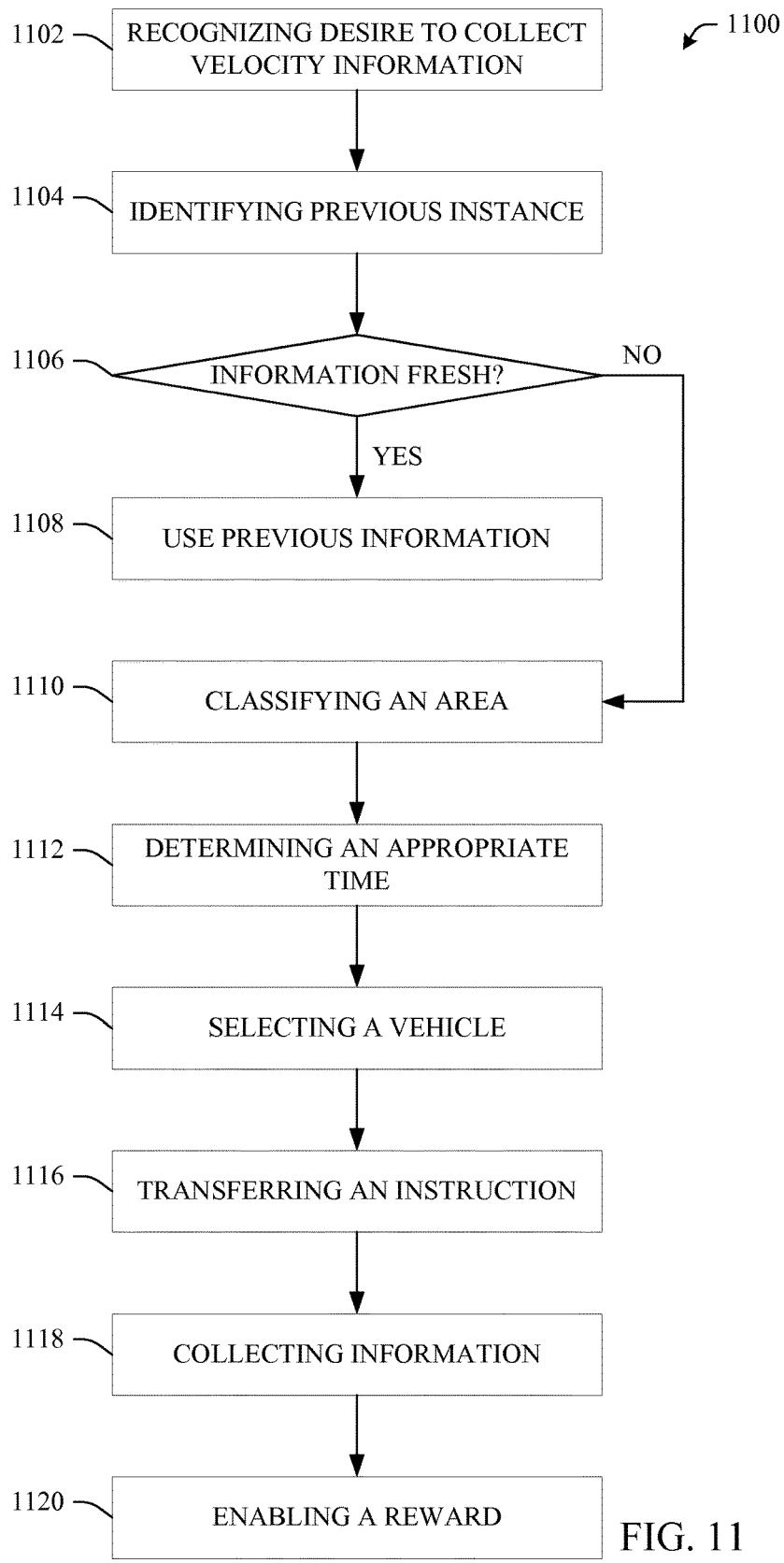
FIG. 11 illustrates an example travel information processing methodology in accordance with an aspect of the subject specification.

Now referring to FIG. 11, an example methodology 1100 is disclosed for operation of a travel information management configuration. A desire to collect velocity information along a set area can be recognized at action 1102. For instance, a user can make a request to travel between two places and a road is commonly used to link those places—thus, there is a desire to learn how fast vehicles are travelling upon that road. Thus, there can be recognizing a desire to collect velocity information where an instruction is not transferred without an identified desire. While specific aspects are disclosed for a user requesting information for a route, it is to be appreciated that other configurations can be practiced. For example, an accurate traffic model can be retained and periodically or continuously be updated. Upon request, a central server can provide information related to the traffic model to a vehicle.

At block 1104, there can be identifying if there is a previous instance of velocity information collection from a designated road. For example, a determination can be made that velocity information from a particular road has not been collected within a period. Thus, block 1104 can represent identifying a previous instance of collecting information.

A trigger 1106 can occur determining if information collected in the previous instance is of an appropriate freshness level and/or can occur after data becomes stale, is no longer current (e.g., there is a change in weather), and the like. A policy can be that if information is more than x minutes old, then information is considered not fresh. If the information is fresh enough, then previous information can be used at event 1108. However, if previously gathered information is not recent enough, then the methodology 1100 can attempt to gather information that is more recent.

At block 1110, there can be classifying an area upon which velocity information should be collected, the selected vehicle is located upon the classified area. For instance, when a user desires to travel between two locations where there is one main road, then the classified area can be the road. In addition, an appropriate time can be determined at event 1112. For example, if the specified road is not to be travelled upon for many hours, then a later time can be selected so information can be of a higher freshness level.

There can be selecting at least one vehicle upon which an instruction to supply travel information is transferred at event 1114. For example, selection of a vehicle can occur as a function of balancing membership requirements. A membership standard be that a vehicle produce travel information x times over y period. If a first vehicle previously produced travel information x times over y period and a second vehicle produced travel information x−2 times over y period, then an instruction can transfer to the second vehicle since a membership quota is not yet met. Ultimately, the instruction can be transferred at action 1116. In an alternate embodiment, event 1114 and action 1116 can represent scanning for a vehicle that matches a longitude range, latitude range, and directional range (e.g., north, north+/−15 degrees, etc.) as well as halting scanning upon discovering a matching vehicle, discovery occurs upon a response from the matching vehicle. Thus, locating vehicles and sending an instruction are done in one instance, where a broadcast is provided making a request and the broadcast is used to locate a vehicle.

A vehicle can process the instruction and return the travel information. There can then be collecting velocity information that relocates from the at least one vehicle that is transferred the instruction at event 1118. The information can transfer to another vehicle, be used to generate a direction set, be used in creating a general traffic model, and the like. According to one configuration, successful obtainment of travel information can enable a reward to be supplied to an entity at act 1120.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

A personal electronic device can include Wifi (potentially short for 'wireless fidelity') capabilities that can work in an ad-hoc, low power mode to create local meshes of observation nodes (e.g., vehicles). In one example, a relatively large number of vehicles are decelerating towards a congested spot on a road; as the devices notice this slow-down (trend of velocity) a notice can be transferred to members of the mesh that some vehicles are experiencing a downward trend. The vehicles can device among themselves a vehicle that can notify a central service of the trend. The mesh can be organic and develop based upon various characteristics—such as losing mesh members as members exit a highway system (e.g., through use of an off-ramp). Additionally, different vehicles can be requested to be more diligent about travel. For instance, if a vehicle is approaching an area with heavy traffic during rush hour, then a request can be given to the vehicle to provide information more frequently so it can be determined when rush hour begins.

Figure 12:
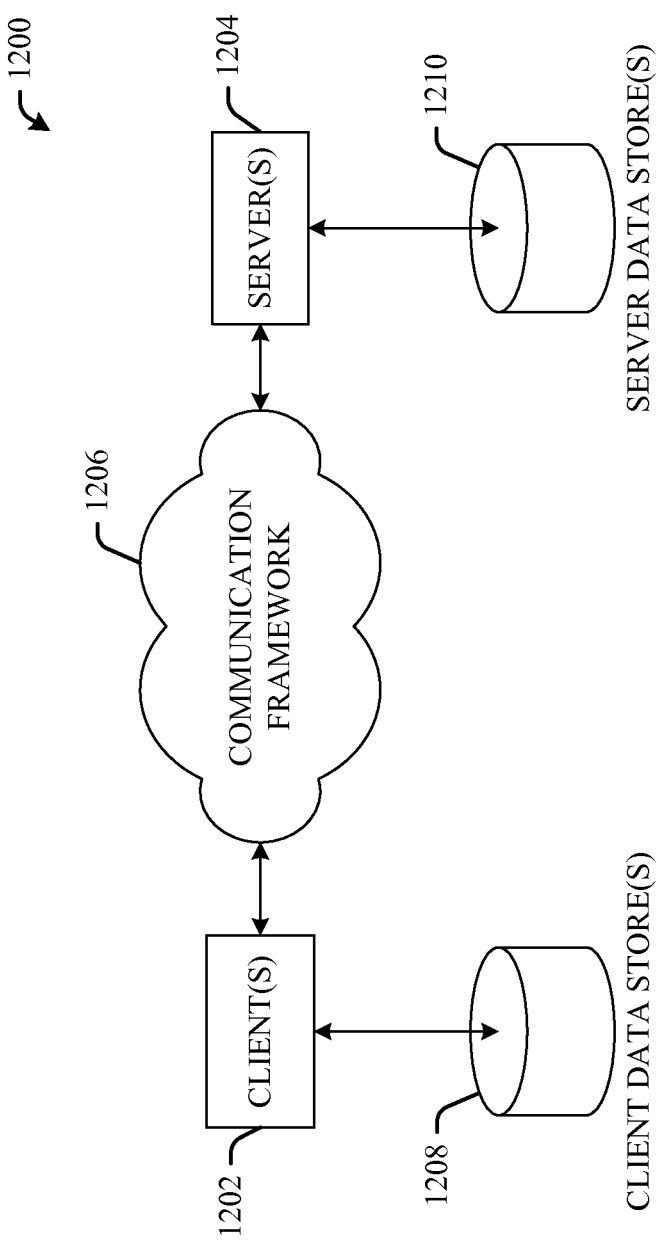
FIG. 12 illustrates an example of a schematic block diagram of a computing environment in accordance with an aspect subject specification.
Figure 13:
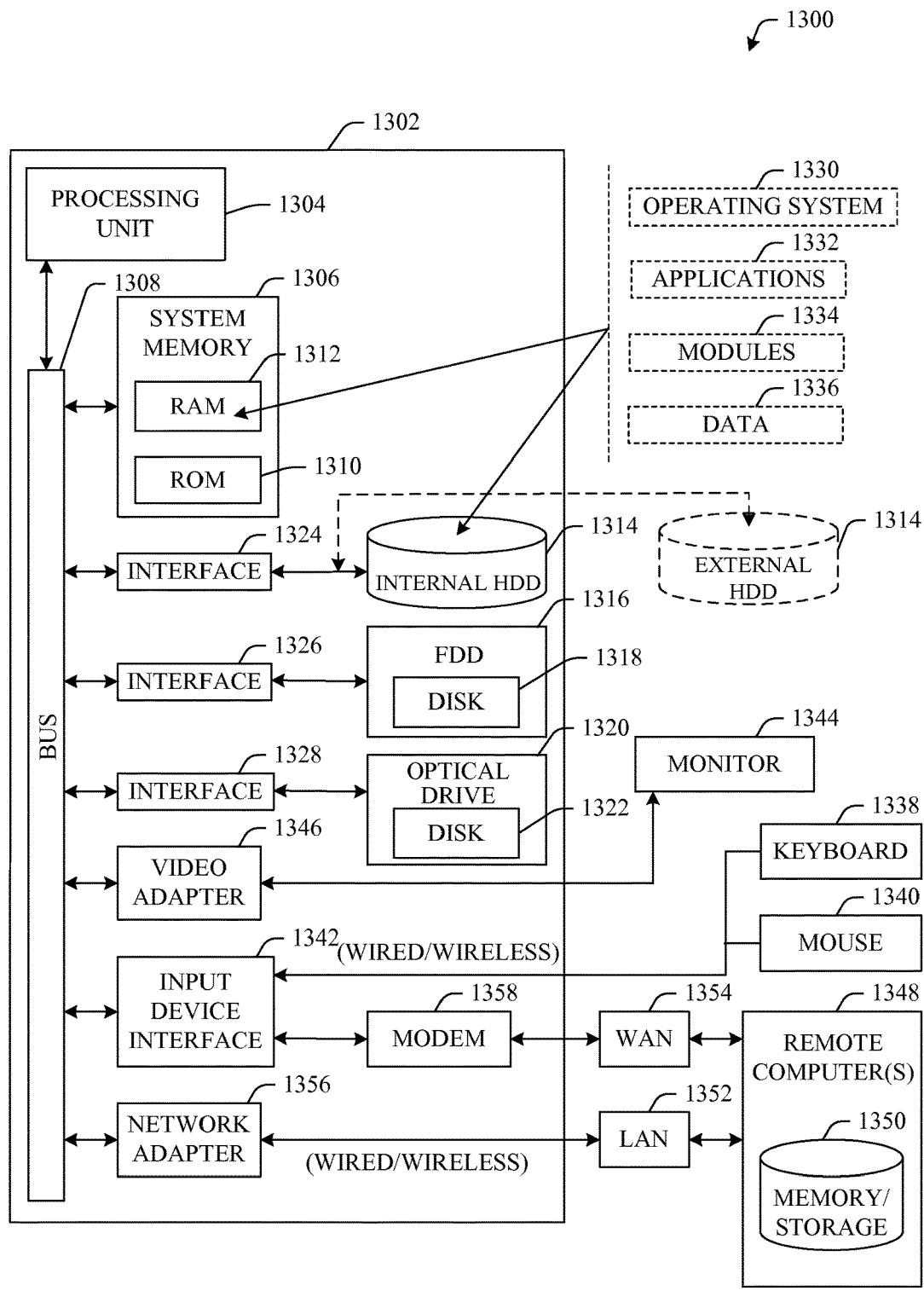
FIG. 13 illustrates an example of a block diagram of a computer operable to execute the disclosed architecture.

In order to provide a context for the various aspects of the disclosed subject matter, FIGS. 12 and 13 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 12, there is illustrated a schematic block diagram of a computing environment 1200 in accordance with the subject specification. The system 1200 includes one or more client(s) 1202. The client(s) 1202 can be hardware and/or software (e.g., threads, processes, computing devices). The client(s) 1202 can house cookie(s) and/or associated contextual information by employing the specification, for example.

The system 1200 also includes one or more server(s) 1204. The server(s) 1204 can also be hardware and/or software (e.g., threads, processes, computing devices). The servers 1204 can house threads to perform transformations by employing the specification, for example. One possible communication between a client 1202 and a server 1204 can be in the form of a data packet adapted to be transmitted between two or more computer processes. The data packet can include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

Referring now to FIG. 13, there is illustrated a block diagram of a computer operable to execute the disclosed architecture. In order to provide additional context for various aspects of the subject specification, FIG. 13 and the following discussion are intended to provide a brief, general description of a suitable computing environment 1300 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 13, the example environment 1300 for implementing various aspects of the specification includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors or proprietary specific configured processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the specification can be implemented with various proprietary or commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the input device interface 1342. In a networked environment, program modules depicted relative to the computer 1302, or portions thereof, can be stored in the remote memory/storage device 1350. It will be appreciated that the network connections shown are example and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:
    transmitting, by a device and to a plurality of vehicles located in a same geographic region, a request to provide velocity information;
    receiving, by the device, a response to the request from a vehicle of the plurality of vehicles, the response including the velocity information; and
    in response to receiving the response, transmitting, by the device, a suppression signal to one or more other vehicles of the plurality of vehicles, the suppression signal to cancel the request.

2. The method as recited in claim 1, wherein the same geographic region comprises a segment of a roadway, the method further comprising validating the velocity information as credible velocity information for the segment of the roadway prior to transmitting the suppression signal.

3. The method as recited in claim 1, wherein the device is associated with a particular vehicle in the same geographic region.

4. The method as recited in claim 3, wherein transmitting the request is performed in response to the particular vehicle entering the same geographic region.

5. The method as recited in claim 1, wherein a portion of vehicles of the plurality of vehicles are not members of a travel information sharing service.

6. The method as recited in claim 1, further comprising, in response to receiving the response, associating a reward with the vehicle, the reward including at least one of transferring money to a bank account associated with the vehicle, transferring a toll credit to a toll account associated with the vehicle, or transferring points that can be used to obtain a product or a service to a points account associated with the vehicle.

7. The method as recited in claim 1, wherein the request is transmitted in response to detecting traffic congestion in the same geographic region.

8. A device comprising:
    one or more processors; and
    memory comprising computer-executable instructions that, when executed by the one or more processors, cause the device to:
    determine a road segment currently being traveled by a vehicle associated with the device;

broadcast a request for vehicles in the road segment to provide velocity information;

receive a response to the request from a responding vehicle, the response including the velocity information; and in response to receiving the response, broadcast a suppression signal to the vehicles to cancel the request.

9. The device of claim 8, wherein the computer-executable instructions further cause the device to determine a direction of travel of the vehicle, wherein the request indicates the direction of travel of the vehicle, and wherein the responding vehicle is traveling in the direction of travel of the vehicle.

10. The one or more computer storage media of claim 9, wherein the computer-executable instructions further cause the device to:

determine a next road segment based, at least in part, on the road segment and the direction of travel of the vehicle; and after broadcasting the request and before receiving the response, waiting for a period of time to elapse before broadcasting a next request for an upcoming vehicle in the next road segment to provide at least one of a next velocity information or a next location information, and wherein the suppression signal further cancels the next request.

11. The device of claim 8, wherein the computer-executable instructions further cause the device to validate the velocity information as credible velocity information for the road segment currently being traveled prior to broadcasting the suppression signal.

12. The device of claim 8, wherein the vehicle and the responding vehicle are members of a travel information sharing service.

13. The device of claim 8, wherein the computer-executable instructions further cause the device to associate a reward with the responding vehicle.

14. A system comprising:
one or more processors;
memory coupled to the one or more processors;
a network interface coupled to the one or more processors; and
computer-readable instructions stored in the memory and executable by the one or more processors to:

receive, via the network interface, a request to provide at least one of velocity information or location information in a geographic region;

in response to receiving the request, determine at least one of a response velocity information or a response location information to include in a response to the request;

receive, via the network interface, a suppression signal, the suppression signal to cancel the request; and in response to receiving the suppression signal, canceling the response to the request.

15. The system of claim 14, wherein the system further comprises a global positioning device, and wherein the geographic region is determined, at least in part, based on output of the global positioning device.

16. The system of claim 14, wherein the response is scheduled to be sent after a period of time has elapsed.

17. The system of claim 16, wherein the period of time is determined, based at least in part, by a random number generator.

18. The system of claim 14, wherein the system is part of a vehicle.

19. The system of claim 18, wherein:
the device from which the request is received is associated with a requesting vehicle; and
the vehicle and the requesting vehicle are members of a travel information sharing service.

20. The system of claim 18, further comprising one or more sensors, wherein at least one of the response velocity information or the response location information is determined, based at least in part, on output from the one or more sensors.

* * * * *